(12) United States Patent
Moyle

(10) Patent No.: US 9,107,423 B1
(45) Date of Patent: Aug. 18, 2015

(54) POULTRY EUTHANASIA DEVICE

(71) Applicant: Ryan Moyle, Heyburn, ID (US)

(72) Inventor: Ryan Moyle, Heyburn, ID (US)

( * ) Notice: Subject to any disclaimer, the term of this patent is extended or adjusted under 35 U.S.C. 154(b) by 0 days.

(21) Appl. No.: 14/613,202

(22) Filed: Feb. 3, 2015

Related U.S. Application Data

(60) Provisional application No. 61/935,228, filed on Feb. 3, 2014.

(51) Int. Cl.
| | | |
|---|---|---|
| *A22B 3/00* | (2006.01) | |
| *A22B 3/08* | (2006.01) | |
| *A22C 21/00* | (2006.01) | |

(52) U.S. Cl.
CPC . *A22B 3/005* (2013.01); *A22B 3/08* (2013.01); *A22C 21/0053* (2013.01)

(58) Field of Classification Search
USPC .................................. 452/52, 57, 173, 177
See application file for complete search history.

(56) References Cited

U.S. PATENT DOCUMENTS

| | | | | |
|---|---|---|---|---|
| 3,716,892 A | * | 2/1973 | Miles et al. ..................... | 452/76 |
| 3,744,088 A | * | 7/1973 | Snowden ......................... | 452/77 |
| 6,551,182 B2 | * | 4/2003 | Caracciolo, Jr. ................ | 452/81 |
| 7,241,212 B2 | * | 7/2007 | Horst et al. ..................... | 452/58 |
| 7,625,271 B2 | * | 12/2009 | Katori et al. .................... | 452/177 |
| 7,950,986 B2 | * | 5/2011 | Kelly et al. ..................... | 452/77 |
| 8,062,105 B2 | * | 11/2011 | Aandewiel et al. ............. | 452/77 |
| 8,684,799 B2 | * | 4/2014 | Brink et al. .................... | 452/173 |

FOREIGN PATENT DOCUMENTS

EP       1520479   B1       11/2012

\* cited by examiner

*Primary Examiner* — Richard Price, Jr.
(74) *Attorney, Agent, or Firm* — Robert L. Shaver; Shaver & Swanson, LLP

(57) ABSTRACT

A poultry euthanasia device in which hens pass on belts though a gas proof enclosure with increasing concentration levels of toxic gas for more humane euthanasia, and exit the machine deceased. The device has an entry chute which is connectable to a hen house located to either side of the unit, or behind the unit. A number of belts carry the hens through the machine, and they painlessly go to sleep and die due to a high $CO_2$ atmosphere.

15 Claims, 3 Drawing Sheets

POULTRY EUTHANASIA DEVICE

PRIORITY/CROSS-REFERENCE TO RELATED APPLICATIONS

This application claims the benefit of U.S. Provisional Application No. 61/935,228, filed Feb. 3, 2014 the disclosure of which is incorporated by reference.

TECHNICAL FIELD

The presently disclosed technology relates to poultry processing, and more specifically to poultry euthanasia.

BACKGROUND

Presently there is a great need for an efficient method to euthanize spent laying hens with an emphasis on concern for the animal's welfare. Historically, spent laying hens had been processed for human consumption, however, there has been a great decline in this practice for the following reasons:

1. Consolidation of poultry meat processing plants has led to their sparse disbursement across America. Therefore, many egg farms are simply too far away to transport the birds, making it cost prohibitive.

2. Transportation of these old hens is complicated by the hens tendency to have brittle bones. This has led to problems with animal welfare issues, and problems with bone shards ending up in the chicken soup. Therefore, on-farm euthanasia for delivery to a rendering plant or composting has become much more a necessity.

Disease control has led to the need for rapid on-farm euthanasia because the birds should not be transported live if farmers are trying to contain an outbreak. Avian influenza (bird flu), salmonella, and other contagious diseases have become a much larger concern lately and have led to mass depopulations to control disease when necessary.

Animal welfare concerns have become a much larger issue over the years. Ag industry organizations attempt to self-regulate and make recommendations via producer groups and encourage producers to follow American Veterinary Medicine Association guidelines in order to reduce the incidences of bad publicity. Additionally, states are passing animal cruelty laws that are vague at best. Thus farmers are caught in the cross hairs. They may have the USDA or CDC forcing them to depopulate their flock on-farm, but lack the tools to do so and satisfy AVMA guidelines.

The present devices and methods for on-farm poultry euthanasia have been developed by individual farmers for their own needs and they would really rather not publicize that part of their business. One such method is Modified Atmospheric Killing (MAK) carts, but it is slow, inconsistent, and archaic and labor intensive. These involve some kind of manually filled cart, which is covered and filled with $CO_2$ gas. There is no way to accurately measure the $CO_2$ concentration, and it is all guesswork. Use of gas $CO_2$ is employed, so using numbers provided by egg farmers using this method, you would need 34 bottles of $CO_2$ gas to depopulate a 40,000 bird coop versus 2-3 bottles of liquid $CO_2$ with operation of the disclosed technology. A person has to load the cart, then begin the process and wait until death. The animals are gassed in the barn, or taken out. Either way, the doors to the barn are open and the increased light makes the animals more nervous and difficult to catch. Moreover, many carts are needed. The cart is then pushed out and unloaded, and from there the dead birds have to be moved into a truck for transport Another method is the use of covered dump trucks. A tarp is placed over the bed of a dump truck, leaving a hole large enough to toss the live birds in. Once the floor of the dump truck is covered with birds they close the hole and then inject $CO_2$ into the bed of the truck. This is very hard on the birds as they are tossed about and these old hens have brittle bones which break easily. Lots of $CO_2$ is wasted because the whole volume of the truck is gassed, then the door is opened for the next batch allowing the $CO_2$ to escape, so it is not efficient.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

The device of the disclosed technology is designed to fill the needs of the industry on many levels. It is the most humane system that satisfies the generally accepted AVMA guidelines of $CO_2$ euthanasia, and is efficient and fast.

The disclosed technology is a poultry euthanasia device, referred to as a hen sleeper. It is a more humane euthanasia due to hens being exposed to a gradual increase in $CO_2$ concentration, which results in less panic for the birds, and the technology is less complicated, and requiring less equipment and being more efficient, requiring less labor. Moreover, it provides the benefit of handing the birds only once as they are placed in a throughput conveyor system that is contained, discrete, prevents hen pileups, euthanizes the birds, and deposits the dead birds into any truck of the farmer's convenience for transport. Additionally, the euthanasia machine of the disclosed technology can be used with any rendering transport truck or composting truck. No special mixers or transport vehicles are required for operation. This makes the disclosed technology more versatile.

The machine can be loaded from a ground floor and/or second floor. The machine is mounted on a trailer with its own generator and built to provide 360 degree service to a bird building, and if so desired the farmer can modify his barn so the machine chute penetrates the barn allowing for several advantages. Depending on size of the model the machine can euthanize and load into trucks between 5,000 and 10,000 chickens per hour. There are two versions: Version #1 is a whole bird version that will euthanize and load whole birds into rendering trucks automatically via an automatic sealed elevator. Version #2 is a composting version that will euthanize, grind the birds into a mash, and load the truck of the farmer's choice. 1-6 below refer to Version #1.

The disclosed technology provides for a gradual introduction of the birds into an increasing concentration of $CO_2$. They are placed into the machine through an entry chute, and on the transport conveyor system, belt where they are initially exposed to a concentration of 25%-35% $CO_2$ for about 20-30 seconds. The transport conveyor system is made up of at least one belt, and preferably three belts.

In one embodiment, they then drop from a first moving belt onto a second moving belt where the $CO_2$ concentration is between 30%-45%. Finally, they drop on to the final belt called a lifting conveyor, at the bottom of the machine where the concentration of $CO_2$ is 50% or greater. This region is designated the first gas reservoir, because it is gas proof, and $CO_2$ being heavier than air tends to accumulate in the lower parts of the machine. The birds are maintained in an elevated CO2 concentration while transported on this last belt in a sealed exit chute around the lifting conveyor. From the exit chute the dead birds are either transported through a collection tube and over a delivery belt and chute to the transport vehicle, or they are dropped into a grinder and pumped as a slurry into a transport vehicle. They are kept under CO2 all the way to the end of the process thereby ensuring death and preventing revival. The graduated introduction of the birds to the CO2 environment is controlled by three factors:

1). CO2 is introduced in the lowest point in the unit, the first gas reservoir, thus as the birds approach the injection point the concentration increases.
2). The inlet and outlet of the disclosed device are at the two highest points. This dynamic takes advantage of the fact that CO2 is heavier than air. Thus, as concentrated liquid CO2 is injected at the bottom of the unit, oxygen is pushed out the top, therefore, the increased height of our machine allows for a natural dispersion of increasing CO2 concentration as the hens approach the bottom.
3) One or more CO2 regulators takes measurements at different sampling points in the unit and up to 7 locations may be monitored to ensure that the birds are being exposed to proper levels of concentration.

A CO2 regulator is also hooked up to an alarm that notifies workers to stop putting birds in the machine if CO2 levels drop below specified concentrations. Additionally, the alarm trips a relay that stops the conveyor until the CO2 levels are returned to specification and reset by the operator. This ensures that birds are dead before being deposited into the transport trucks or composting unit. Unconscious birds can resuscitate if not completely dead.

Current processing devices mostly use gaseous CO2, while some use liquid CO2. However, both have the same problem if there is high volume consistent use: They freeze up. Freezing up is not a major concern for small MAK carts. Gas CO2 is used in small quantities to fill a small bin, and before the lines freeze up the CO2 is turned off. However, this method uses small carts, has high labor needs, and lots and lots of bottles of CO2 are required.

The disclosed technology uses high pressure liquid CO2 jet design, and its location is a novel approach that solves the issue of freezing lines and therefore solves the following:

1). Eliminates the need to carry about so many bottles. One 400 pound bottle of liquid CO2 will replace eight 50 pound bottles of gaseous CO2.
2). The high pressure jet injection allows for the CO2 to stay under very high pressure until it is released into the open air of the euthanasia box, called the $1^{st}$ gas reservoir. As long the liquid CO2 is kept at 100 PSI or greater, it will not turn to a gas and therefore will not freeze up. The main jet injector is mounted right into the side of the euthanasia box so that the liquid is sprayed directly into the box where in turns to a gas outside the delivery line so it does not freeze up in the delivery line. This jet sprays the liquid into a cavity in the bottom of the box below the lifting conveyor so as not to spray the liquid right on the chickens. An important detail is that the application of liquid CO2 does not cause the chickens any pain by giving them frost bite. The tiny hole in the end of the jet injector allows for a high volume of CO2 in liquid form to be delivered into the box while maintaining high pressure between the bottle and the injection site. Additional back up jet injectors are available for a more rapid filling of the box. All of the injectors are situated so they inject into areas between the belts where no chickens would be exposed to direct contact. The main valve at the bottle is open all the way, a main line feeds a manifold that then breaks into four small lines feeding all four jet injectors. Each injector has a valve and a pressure gage right at the injection site so pressure is monitored appropriately. This simple design solves many issues.

The machine has been designed to preserve as much CO2 as possible, making it more efficient. The inlets and outlets (entry chute and exit chute) of the machine are the two highest points, therefore taking advantage of the fact that CO2 is heavier than air. Additionally, the inlet and outlet ports are restricted in size, and air curtains in the form of brushes are present to restrict air flow. Instead of using a spring loaded door that can catch wings, feet, and human fingers, the brushes have been installed that the chickens can be pushed through, which is safer and more effective.

The device of the disclosed technology is designed so the entry chute may penetrate the side of the barn, and the entire machine is enclosed in a gas tight manner all the way into the transport or rendering truck. This allows for the birds to be placed into the machine inside the barn, pass though the machine, and be loaded into the truck in such a manner that a passerby may not see what is happening. For many of these farmers, discretion in this operation is a concern. With the exception of viewing windows for the operator to inspect the process, no one can see anything from the outside.

With minimal modification to the wall of the barn, one can penetrate the side of the wall with the entry chute in such a way that no light comes in around the chute. This allows for the workers to keep all the doors closed and work in low light conditions that keep the chickens much more calm and at ease. It is easier on the birds and makes catching them much easier.

The device of the disclosed technology allows for ground floor or second flood loading of birds. A short entry chute is to be used in the case of ground floor loading and a longer entry chute for second floor loading. Moreover, a chute adaptor is included that allows the angle of the chute to be at an adjustable angle.

The machine of the disclosed technology allows a 360 degree range of service between the loading step and the unloading step of the process. Given that barns have varying degrees of access, the machine is designed as follows: The entry chute may be positioned in either side of the machine, or directly behind the machine, giving 180 degree access to the barn. The delivery chute may also be moved in a 180 degree arc, giving the machine a full 360 degrees of loading and unloading configurations.

There are three possible chute attachments that allow the trailer 180 degrees service for loading the birds. They can be loaded from the rear, driver's side, or passenger side of the trailer.

The sealed exit elevator maintains the birds under CO2 suppression and can be rotated over 180 degrees and elevated as needed to give the operator plenty of versatility in where he wants to park the transport or rendering truck.

An alternative embodiment of the machine has a grinding/composting unit attached to the end of the elevator out of the primary euthanasia box. The grinding unit turns the whole birds into a ground mash that is more suitable for composting. Moreover, the grinding unit includes a pump and hose that allows the operator to load any truck or compost spreader in the same operation. The grinding unit is has the following two benefits:

CO2 efficiency: The grinding unit is built right onto the end of the euthanasia box thereby sealing the unit. This reduces the use of CO2 because the no CO2 escapes through the grinder, it will take the path of least resistance which is back though the machine and out the inlet where the birds are introduced. Basically, instead of two open ends, you only have one which reduces the loss of CO2.

Irreversibility: Although unlikely, in version #1 the possibility exists that a bird may not be completely dead when deposited into the rendering truck, only unconscious, and may self-resuscitate later. Nobody wants to see chickens bailing out of a truck going down the freeway in front of a school. Although all precautions have been taken to ensure this does not happen, including the alarm system to shut the machine down if CO2 concentrations run low, two unpredictable phenomena are also at work: Human error and Mother Nature. The composting unit has the advantage that if this should occur, the worst that would happen is that an unconscious bird is run through the high speed grinder. Which should not be a problem because the animal is unconscious and therefore will feel nothing. Moreover, the grinder is high speed and capable of processing 6 chickens per second, so death would be instantaneous even if unconscious.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
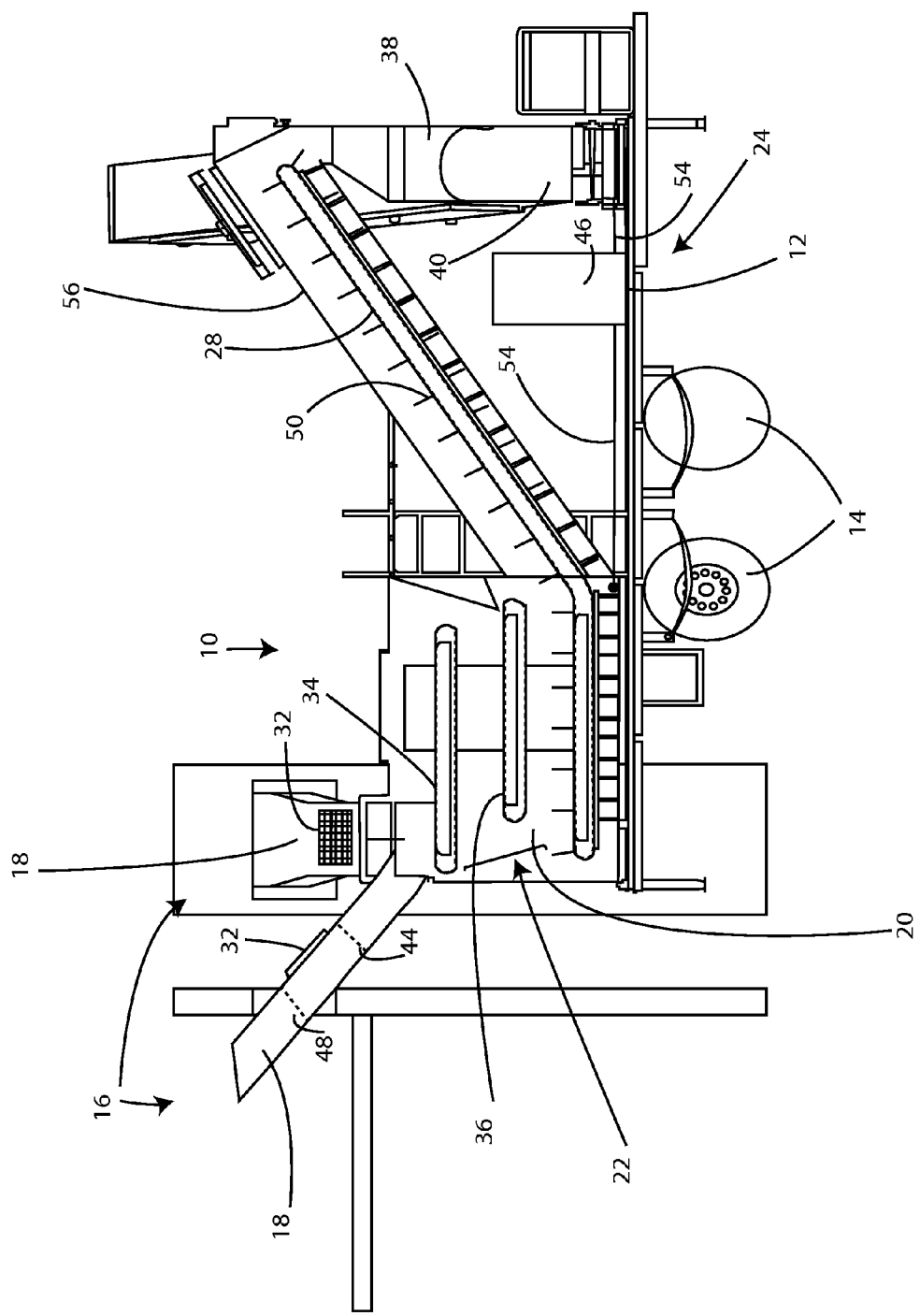
FIG. 1 is a side view cross section of an embodiment of the disclosed technology.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
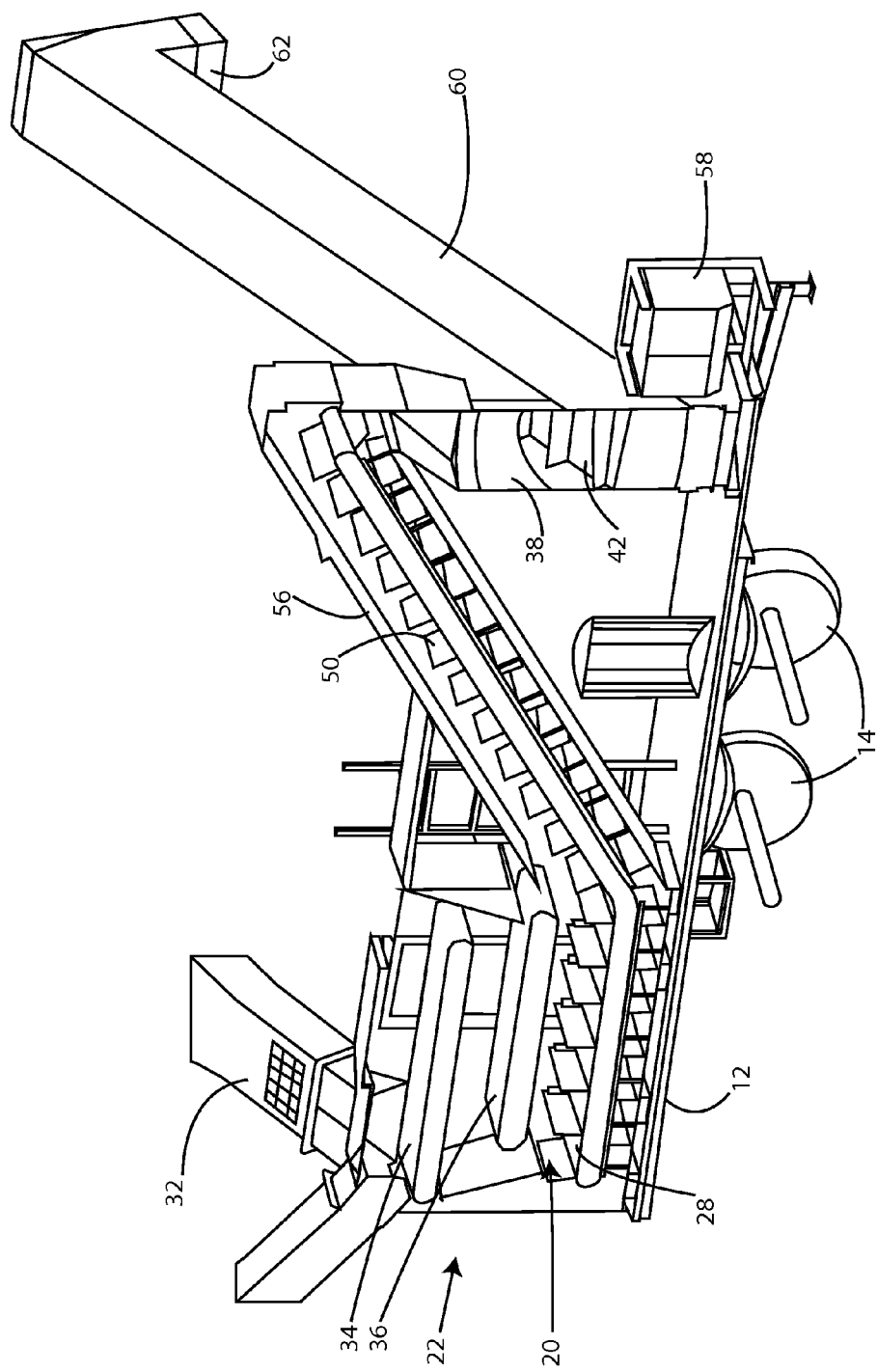
FIG. 2 is a perspective cross section of an embodiment of the disclosed technology.
Figure 3:
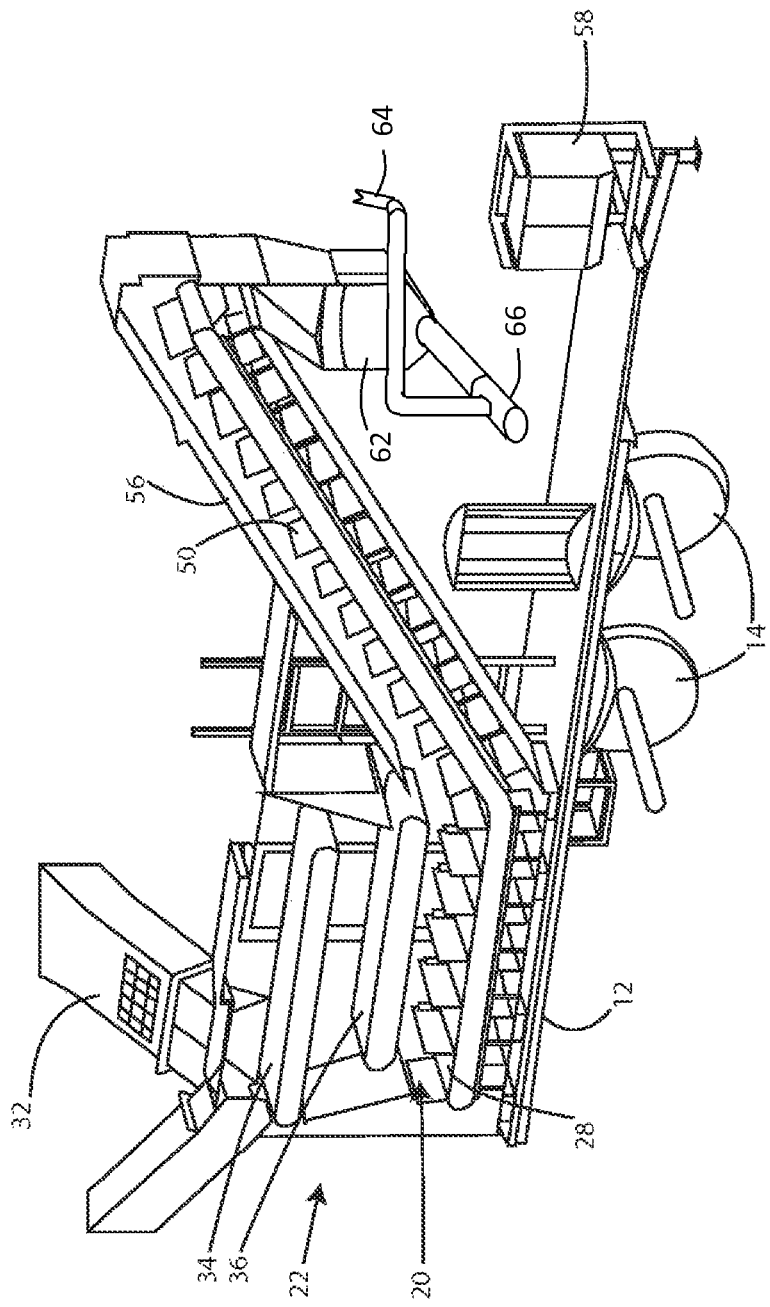
FIG. 3 is a perspective cross section of an embodiment of the disclosed technology which includes a grinder.

Preferred embodiments of the disclosed technology are shown in the FIGS. 1-3. FIG. 1 shows the euthanasia device 10, referred to as the hen sleeper 10. The hen sleeper 10 is mounted on the trailer 12 which is transported by use of wheels 14. The hen sleeper 10 is positioned adjacent to a hen house 16 as an example. An entry chute 18 is inserted through the wall of the hen house 16 for entry of hens into the hen sleeper 10. Included on the entry chute 18 is a vacuum break 32 which may be a metal screen covering a hole in the chute. Between the hen sleeper 10 and the vacuum break 32 is positioned a first air curtain 44. The first air curtain can be a brush which extends from the top and bottom of the chute. Hens can easily pass between the brushes of the air curtain, and enter the hen sleeper. Between the vacuum break 32 and the hen house 16 is a second air curtain 48. If the hen house has a negative air pressure it will tend to draw air from the hen sleeper into the hen house. The vacuum break provides a path of less resistance for air to be drawn into the hen house. The air curtains increase resistance to air from the hen sleeper being drawn into the hen house.

One configuration of the hen sleeper 10 uses 3 moving belts to move hens into and through the hen sleeper 10. A first moving belt 34 is directly below the entry chute 18, and hens drop onto the first moving belt from the entry chute. The hens move toward the right on the belt as shown in FIG. 1, in a low CO2 atmosphere, and drop onto the $2^{nd}$ moving belt 36. This belt moves from right to left as shown in FIG. 1, and is in a higher concentration of CO2.

From $2^{nd}$ moving belt 36, the hens drop onto the lifting conveyor 28, and move to the right as seen in FIG. 1. In one configuration, the lifting conveyor can be a belt with attached paddles, which prevent the hens from sliding down the lifting conveyor. The region there the belt are located is called the $1^{st}$ gas reservoir, and is gas proof except for the end of the entry chute. CO2 gas accumulates and stays in the $1^{st}$ gas reservoir, and the hens pass through the CO2 rich region.

Shown in FIG. 1 is a CO2 canister 46 and the gas lines 54 that make up the toxic gas injection system 52. A CO2 canister 46 with liquid CO2 forms the toxic gas source. The gas lines 54 go at least to the bottom of the $1^{st}$ gas reservoir 20, and inject liquid CO2 into the $1^{st}$ gas reservoir 20, where it volatilizes and become gaseous CO2. CO2 liquid can also be injected at the top of the lifting conveyor 28, and between belts 34 and 36. The CO2 is pressurized in the gas lines and exits a jet as a liquid under pressure, and the release site. CO2 sensors are present at several locations, and can trigger an alarm which warns operators that CO2 concentrations are lower than required. The alarm can shut off the belts, so that hens are assured of enough residence time in a high CO2 environment to not revive. Gas injectors are present in at least the $1^{st}$ gas reservoir 20, and also at top of the lifting conveyor 28, and optionally between the $1^{st}$ moving belt 34 and the second moving belt 36. A generator 58 is present which powers the motors which drive the belts.

A typical configuration of the hen sleeper is mounted on a flatbed trailer 12 which can be approximately 96 inches wide and 240 inches long. The chamber which houses the first and second moving belt is typically approximately 36 inches wide, 96 inches long and 60 inches tall. The entry chute 18 may be 12 inches tall and 72 inches long and 48 to 32 inches wide. The entry chute 18 can be attached to two or more attachment points as shown in FIG. 1. This allows the hen sleeper to attach to a hen house directly behind the trailer and to either side of the trailer. The first moving belt 34 is preferably a belt of linked plastic plates, which minimizes pinch points and hang-up points. In one configuration, the first moving belt 34 is 32 inches wide and 72 inches long. In the same embodiment, the second moving belt 36 can be 36 inches wide and 72 inches long. In the same embodiment, lifting conveyor $3^{rd}$ belt 28 can have a horizontal portion which is about 36 inches wide and 96 inches long, and a sloping portion which is 12 feet long. The paddles or flites 50 for this configuration can be 6 inches extending from the belt and is as wide as the belt.

FIG. 2 shows more of the front end of the hen sleeper, and where the exit chute 56 drops into a collection tube 38. CO2 gas can be injected into the top of chute 56, and provides a $2^{nd}$ gas reservoir and more exposure time for the hens to be in a high $CO_2$ concentration area. The bottom of collection tube 38 can be attached to a delivery belt 42, and a sealed delivery chute 60, which moves the hens to a point to be deposited in a transfer vehicle of some kind. The delivery chute 60 is configured to rotate around the collection tube 38, and can thus swing 180 degrees or more around the tongue of the trailer. An optional grinder 62 can be placed at the exit of the delivery chute 60, or at the end of the exit chute, so that hens are ground into pieces upon leaving the hen sleeper 10, and before entering the transport vehicle.

FIG. 3 shows a version in which the collection tube, delivery belt and delivery chute are replaced by a grinder 62, which is attached to a slurry pump 66 and a slurry hose 64, with the dead birds ground into a slurry in the grinder, and pumped to a transport vehicle.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A portable hen sleeper, for removing life poultry from a hen house for continuous process euthanasia and transport, comprising;
    an entry chute for loading poultry into said hen sleeper;
    a first gas reservoir for collection of a toxic gas;
    a hen transport conveyor for transport of hens through increasing and regulated concentrations of $CO_2$ from said entry chute into and through said first gas reservoir;
    a toxic gas injection system comprising liquid $CO_2$; and
    a lifting conveyor for moving hens from said first gas reservoir into a transport vehicle.

2. The portable hen sleeper of claim 1 in which said entry chute further comprises a vacuum break, to prevent $CO_2$ gas from being drawn from said first gas reservoir into said hen house.

3. The portable hen sleeper of claim 1 in which said hen transport conveyor further comprises at least one moving belt on which hens are moved through said first gas reservoir.

4. The portable hen sleeper of claim 1 in which said hen transport conveyor further comprises at least two moving belts on which hens are moved through said first gas reservoir.

5. The portable hen sleeper of claim 1 in which said hen transport conveyor further comprises at least three moving belts on which hens are moved through said first gas reservoir.

6. The portable hen sleeper of claim 1 in which said lifting conveyer drops hens into a generally vertical collection tube, with said collection tube fillable with $CO_2$ gas and thus forming a second gas reservoir.

7. The portable hen sleeper of claim 6 in which said collection tube is joined to a delivery belt enclosed in a delivery chute, for delivery of hens to a transport vehicle.

8. The portable hen sleeper of claim 1 which is mounted to a trailer for transport to different hen houses.

9. The portable hen sleeper of claim 1 which further comprises an air curtain on an inboard side of said entry chute, for partially blocking toxic gas from being drawn out of said first gas reservoir.

10. The portable hen sleeper of claim 1 in which said liquid $CO_2$ injection system further comprises one or more canisters of liquid $CO_2$.

11. The portable hen sleeper of claim 1 which further comprises multiple connection ports configured for connection of an entry chute, so that said entry chute may be connected to said first gas reservoir from multiple directions.

12. A portable hen sleeper, for removing hens from a hen house for euthanasia and transport, comprising;
    an entry chute for connection to said hen house, for passage of hens from said hen house to said hen sleeper;
    a first gas reservoir for collection of a toxic gas;
    a hen transport conveyor comprised of a plurality of moving belts for transport of hens through increasing and regulated concentrations of $CO_2$ from said entry chute into and through said first gas reservoir;
    a liquid $CO_2$ injection system comprising a liquid $CO_2$ gas source comprising at least one cylinder of liquid $CO_2$;
    a lifting conveyor for moving hens from said first gas reservoir into a generally vertical collection tube, with said collection tube fillable with toxic gas and thus forming a second gas reservoir; and
    a delivery belt attached to said collection tube, for moving said hens from said collection tube to a nearby transport vehicle.

13. The portable hen sleeper of claim 12 in which said hen transport conveyor further comprises at least three moving belts on which hens are moved through said first gas reservoir.

14. A portable hen sleeper, for removing hens from a hen house for euthanasia and transport, comprising;
    an entry chute for connection to said hen house, for passage of hens from said hen house to said hen sleeper;
    a first gas reservoir for collection of a toxic gas;
    a hen transport conveyor comprised of a plurality of moving belts for transport of hens through increasing and regulated concentrations of $CO_2$ from said entry chute into and through said first gas reservoir;
    a liquid $CO_2$ injection system comprising a liquid $CO_2$ gas source comprising at least one cylinder of liquid $CO_2$;
    a lifting conveyor for moving hens from said first gas reservoir into a generally vertical collection tube, with said collection tube fillable with toxic gas and thus forming a second gas reservoir; and
    a grinder attached to an end of said lifting conveyor for grinding said hens into a pumpable slurry; and
    a slurry pump and slurry tubing attached to said grinder for delivering hen slurry to a transport vehicle.

15. The portable hen sleeper of claim 14 in which said hen transport conveyor further comprises at least three moving belts on which hens are moved through said first gas reservoir.

* * * * *